United States Patent Office 3,203,972
Patented Aug. 31, 1965

3,203,972
ARYLACETYLPHENYL CHLOROFORMATES
Edward L. Schumann, Portage, Mich., assignor to The Upjohn Company, Kalamazoo, Mich., a corporation of Delaware
No Drawing. Original application Mar. 18, 1963, Ser. No. 266,089. Divided and this application Apr. 29, 1964, Ser. No. 363,617
3 Claims. (Cl. 260—463)

This application is a division of my co-pending application, Serial No. 266,089, filed March 18, 1963.

This invention relates to new and useful chemical compounds and more particularly to phenylacetylphenyl chloroformates which are useful as intermediates in the preparation of phenylacetylphenyl carbamates, which in turn are useful as sedatives and anti-inflammatory agents.

The novel compounds of the present invention are represented by the following structural formulas:

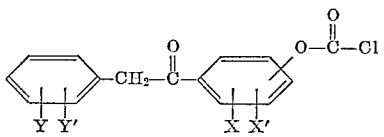

(I)

and

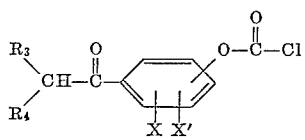

(II)

where in each of X and Y is from zero to 3 alkoxys of from 1 to 2 carbon atoms, inclusive; X' is selected from the group consisting of from zero to 2 halogens and from zero to 2 alkyls of from 1 to 3 carbon atoms, inclusive; and Y' is selected from the group consisting of from zero to 1 halogen, from zero to 1 nitro, and from zero to 1 methyl; and $R_3$ and $R_4$ are selected from the group consisting of phenyl, tolyl, and methoxyphenyl.

The starting material for the preparation of the compounds of the present invention is a hydroxyacetophenone of the formula:

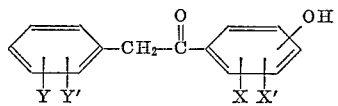

(III)

and

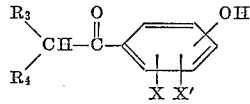

(IV)

wherein $R_3$, $R_4$, X, X', Y, and Y' are as hereinbefore defined.

The novel phenylacetylphenyl chloroformates of Formulas I and II are prepared by reacting a compound of Formulas III and IV, preferably in the form of an alkali metal salt, e.g., sodium or potassium salt, with phosgene. The starting compound of Formulas III and IV is mixed with an aqueous solution of a base, for example, sodium or potassium hydroxide, and a solution of phosgene in an inert organic solvent, for example, toluene, benzene, diethyl ether, and the like. This reaction is exothermic and is advantageously carried out at temperatures between about −30° C. and about +30° C. The phosgene:organic solvent solution is added slowly and with mixing to prevent localized heating or undesirable temperatures above 30° C. The chloroformate, thus formed, accumulates in the organic phase and the aqueous phase is separated. The chloroformate can be isolated and purified by conventional techniques, e.g., by recrystallization, distillation, etc., or it can be used without further purification in the preparation of the phenylacetylphenyl carbamates referred to above (see Formulas V and VI below).

On reaction of the chloroformates of Formulas I and II with ammonia or an amine of the formula

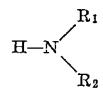

compounds of the following formulas are obtained:

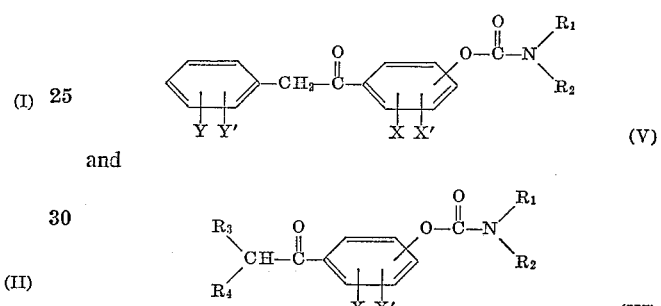

(V)

and (VI)

wherein $R_1$ and $R_2$ taken individually represent a member selected from the group consisting of hydrogen, alkyl of from 1 to 4 carbon atoms, inclusive, and alkenyl of from 3 to 4 carbon atoms, inclusive, and taken together with —N< represent saturated heterocyclic amino selected from the group consisting of unsubstituted and mono- and polyalkyl substituted piperidino, morpholino, thiamorpholino, pyrrolidino, hexamethylenimino, heptamethylenimino, octamethylenimino, and homomorpholino wherein each alkyl is of from 1 to 4 carbon atoms, inclusive, and $R_3$, $R_4$, X, X', Y, and Y' are as hereinbefore defined.

The reaction of ammonia or the amine with the chloroformate is carried out in the presence of a solvent, for example, water, diethyl ether, and dioxane. The reaction is advantageously carried out at temperatures in the range of about 10° C. to about 50° C. The rate of reaction is slow at temperatures below about 10° C.; and at temperatures above about 50° C., the ammonia or amine can volatilize and decomposition of the chloroformate intermediate or carbamate product can occur. Stoichiometrically, the reaction requires one mole of amine for each mole of chloroformate. However, the reaction produces one mole of hydrogen chloride, so an excess of ammonia or the amine, preferably about at least one mole excess, or another suitable acid acceptor, for example, triethylamine, pyridine, picoline, sodium hydroxide, and the like should be employed. The carbamate product of Formula V or VI is recovered by conventional methods, for example, filtering off any solids, removing the solvent, washing and recrystallization from a suitable solvent.

Representative groups within the scope of the present invention include: alkyl, e.g., methyl, ethyl, propyl, isopropyl, butyl, and isobutyl; alkenyl, e.g., allyl, methallyl, and crotyl; halogen, e.g., fluoro, chloro, bromo, and iodo; saturated heterocyclic amino, e.g., piperidino, morpholino, thiamorpholino, pyrrolidino, hexamethylenimino, heptamethylenimino, octamethylenimino, homomorpholino, 2-methylhexamethylenimino, 2,2-dibutylhexamethylenimino, 3,6-dimethylhexamethylenimino, 2-ethylmorpholino, 2-ethyl-5-methylmorpholino, 3,3-dimethylmorpholino, 3-methylthiamorpholino, 2,3,5,6-tetramethylthiamorpholino, 2,3,6-trimethylthiamorpholino, 2-methylpiperidino, 3-methylpiperidino, 4-methylpiperidino, 2-butylpiperidino, 2-propylpiperidino, 4-isopropylpiperidino, 3,4-diethylpiperidino, 2-sec.butylpyrrolidino, 2,2-dimethylpyrrolidino, 2-ethylpyrrolidino, 3,4-dimethylpyrrolidino, and 2-isopropylpyrrolidino; and alkoxy, e.g., methoxy and ethoxy.

The starting hydroxyacetophenones of Formulas III and IV can be prepared by a Friedel-Crafts reaction between a phenol of the formula:

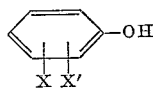

(VII)

wherein X and X′ are as hereinbefore defined, and an acid halide of the formula:

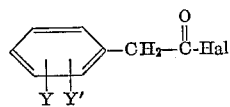

(VIII)

and

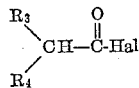

(IX)

wherein Hal is chlorine or bromine, and $R_3$, $R_4$, Y, and Y′ are as hereinbefore defined.

The following examples are illustrative of the preparation of compounds of the present invention but are not to be construed as limiting.

*Example 1.—2-phenylacetylphenyl dimethylcarbamate*

A. 2-phenylacetylphenyl chloroformate: 42.4 grams (0.2 mole) of 2′-hydroxy-2-phenylacetophenone and 8.0 grams (0.2 mole) of sodium hydroxide are added to 150 ml. of water. To this aqueous solution is added a solution of 19.8 grams (0.2 mole) of phosgene in 120 ml. of toluene, prepared by bubbling phosgene into toluene at —10° C. The phosgene:toluene solution is added slowly with mechanical stirring while maintaining the temperature below 25° C. The reaction mixture is stirred for 1.5 hours and filtered to remove solids. The aqueous layer is separated from the organic layer in a separatory funnel and the organic layer washed with 200-ml. portions of 5% aqueous potassium hydroxide solution. The toluene solution is washed with water until neutral and then dried over anhydrous sodium sulfate. The toluene is removed by distillation under reduced pressure to leave 2-phenylacetylphenyl chloroformate as a residue.

B. 2-phenylacetylphenyl dimethylcarbamate: To a solution of 27.4 grams (0.1 mole) of 2-phenylacetylphenyl chloroformate in 200 ml. of anhydrous diethyl ether is added 9.0 grams (0.2 mole) of dimethylamine dissolved in 100 ml. of anhydrous ether. The reaction flask is stirred during the addition to prevent localized heating. The reaction mixture is allowed to stand overnight during which time a precipitate forms. The precipitate is removed by filtration and the ether by means of distillation under reduced pressure to provide 2-phenylacetylphenyl dimethylcarbamate.

*Example 2.—3,5-dimethoxy-4-(4-methoxyphenylacetyl)-2-methylphenyl carbamate*

Following the procedure of Example 1, part A, substituting 2′,6′-dimethoxy-4′-hydroxy-2-(4-methoxyphenyl)-3′-methylacetophenone for the 2′-hydroxy-2-phenylacetophenone, the respective chloroformate is obtained. Following the procedure of part B, commencing with 3,5-dimethoxy-4-(4-methoxyphenylacetyl)-2-methylphenyl chloroformate and substituting ammonia for dimethylamine, 3,5-dimethoxy-4-(4-methoxyphenylacetyl)-2-methylphenyl carbamate is obtained.

*Example 3.—2,3-dimethoxy-6-(3,4-dimethoxyphenyl)acetyl-phenyl methylallycarbamate*

Following the procedure of Example 1, part A, substituting 3′,4′-dimethoxy-2-(3,4-dimethoxyphenyl)-2′-hydroxy-acetophenone for the 2′-hydroxy-2-phenylacetophenone, the respective chloroformate is obtained. Following the procedure of part B, commencing with 2,3-dimethoxy-6-(3,4-dimethoxyphenylacetyl)-phenyl chloroformate and substituting methylallylamine for dimethylamine, 2,3-dimethoxy-6-(3,4-dimethoxyphenylacetyl)phenyl methallylcarbamate is obtained.

*Example 4.—3,4-diethoxy-2-(3-ethoxy-5-methoxyphenylacetyl)-phenyl methylethyl carbamate*

Following the procedure of Example 1, part A, substituting 2′,4′-diethoxy-2-(3-ethoxy-5-methoxyphenyl)-6′-hydroxyacetophenone for the 2′-hydroxy-2-phenylacetophenone, the respective chloroformate is obtained. Following the procedure of part B, commencing with 3,5-diethoxy-2-(3-ethoxy-5-methoxyphenylacetyl)-phenyl chloroformate and substituting methylethylamine for dimethylamine, 3,5-diethoxy-2-(3-ethoxy-5-methoxyphenylacetyl)phenyl methylethylcarbamate is obtained.

*Example 5.—5-methoxy-2-(3-chloro-2,4,6-trimethoxyphenylacetyl)phenyl dicrotylcarbamate*

Following the procedure of Example 1, part A, substituting 2-(3-chloro-2,4,6-trimethoxyphenyl)-2′-hydroxy-4′-methoxyacetophenone for the 2′-hydroxy-2-phenylacetophenone, the respective chloroformate is obtained. Following the procedure of part B, commencing with 5-methoxy-2-(3-chloro-2,4,6-trimethoxyphenylacetyl)phenyl chloroformate and substituting dicrotylamine for dimethylamine, 5-methoxy-2-(3-chloro-2,4,6-trimethoxyphenylacetyl)phenyl dicrotylcarbamate is obtained.

*Example 6.—4-methyl-2-phenylacetylphenyl tetramethylenecarbamate*

Following the procedure of Example 1, part A, substituting 2′-hydroxy-5′-methyl-2-phenylacetophenone for the 2′-hydroxy-2-phenylacetophenone, the respective chloroformate is obtained. Following the procedure of part B, commencing with 4-methyl-2-phenylacetylphenyl chlorofromate and substituting pyrrolidine for dimethylamine, 4-methyl-2-phenylacetylphenyl tetramethylenecarbamate is obtained.

*Example 7.—3-methyl-4-phenylacetylphenyl pentamethylenecarbamate*

Following the procedure of Example 1, part A, substituting 4′-hydroxy-2′-methyl-2-phenylacetophenone for the 2′-hydroxy-2-phenylacetophenone, the respective chloroformate is obtained. Following the procedure of part B, commencing with 3-methyl-4-phenylacetylphenyl chloroformate and substituting piperidine for dimethylamine, 3-methyl-4-phenylacetylphenyl pentamethylenecarbamate is obtaiend.

*Example 8.—2-fluoro-4-phenylacetylphenyl hexamethylenecarbamate*

Following the procedure of Example 1, part A, substituting 3′-fluoro-4′-hydroxy-2-phenylacetophenone for the 2′-hydroxy-2-phenylacetophenone, the respective chloroformate is obtained. Following the procedure of part B, commencing with 2-fluoro-4-phenylacetylphenyl chloroformate and substituting hexamethylenimine for dimethylamine, 2-fluoro-4-phenylacetyphenyl hexamethylenecarbamate is obtained.

Example 9.—2-(2,5-dimethoxyphenylacetyl)-3,4,5-trimethoxyphenyl heptamethylenecarbamate Following the procedure of Example 1, part A, substituting 2-(2,5-dimethoxyphenyl)-6'-hydroxy - 2',3',4'-trimethoxyacetophenone for the 2'-hydroxy-2-phenylacetophenone, the respective chloroformate is obtained. Following the procedure of part B, commencing with 2-(2,5-dimethoxyphenylacetyl)-3,4,5 - trimethoxyphenyl chloroformate and substituting heptamethylenimine for dimethylamine, 2-(2,5-dimethoxyphenylacetyl)-3,4,5-trimethoxyphenyl heptamethylenecarbamate is obtained.

Example 10.—3,5-diethoxy-2-(4-ethoxyphenylacetyl)-4-methoxyphenyl octamethylenecarbamate Following the procedure of Example 1, part A, substituting 2',4' - diethoxy-2-(4-ethoxyphenyl)-6'-hydroxy-3'-methoxyacetophenone for the 2'-hydroxy-2-phenylacetophenone, the respective chloroformate is obtained. Following the procedure of part B, commencing with 3,5-diethoxy - 2 - (4 - ethoxyphenylacetyl) - 4 - methoxyphenyl chloroformate and substituting octamethylenimine for dimethylamine, 3,5-diethoxy-2-(4-ethoxyphenylacetyl)-4-methoxyphenyl octamethylenecarbamate is obtained.

Example 11.—4-(4-ethoxyphenylacetyl)phenyl (1,1-dimethyltetramethylene)carbamate Following the procedure of Example 1, part A, substituting 2-(4-ethoxyphenyl) - 4' - hydroxyacetophenone for the 2'-hydroxy-2-phenylacetophenone, the respective chloroformate is obtained. Following the procedure of part B, commencing with 4-(4-ethoxyphenylacetyl)phenyl chloroformate and substituting 2,2-dimethylpyrrolidine for dimethylamine, 4-(4-ethoxyphenylacetyl)phenyl (1,1-dimethyltetramethylene)carbamate is obtained.

Example 12.—3,5-diethoxy-2-(4-ethoxy-3-methoxyphenylacetyl)phenyl (1-methylpentamethylene)carbamate Following the procedure of Example 1, part A, substituting 2',4' - diethoxy-2-(4-ethoxy-3-methoxyphenyl)-6'-hydroxyacetophenone for the 2'-hydroxy-2-phenylacetophenone, the respective chloroformate is obtained. Following the procedure of part B, commencing with 3,5-diethoxy - 2 - (4 - ethoxy - 3 - methoxyphenylacetyl)phenyl chloroformate and substituting 2-methylpiperidine for dimethylamine, 3,5-diethoxy-2-(4-ethoxy-5-methoxyphenylacetyl)phenyl (1-methylpentamethylene)carbamate is obtained.

Using the following hydroxyacetophenones in Examples 1 through 12, part A, the corresponding chloroformates are obtained:

3'-bromo-5'-fluoro-4'-hydroxy-2-phenyl-,
3'-chloro-5'-fluoro-2'-hydroxy-2-phenyl-,
4'-chloro-2'-hydroxy-2-phenyl-,
5'-chloro-2'-hydroxy-2-phenyl-,
4',6'-dimethoxy-2-(2,3-dimethoxyphenyl)-2'-hydroxy-,
4',6'-dimethoxy-2'-hydroxy-2-(2-methoxyphenyl)-,
4',6'-dimethoxy-2'-hydroxy-2-(4-methoxyphenyl)-,
4',6'-dimethoxy-2'-hydroxy-2-(4-methoxyphenyl)-3'-methyl-,
4',6'-dimethoxy-2'-hydroxy-2-(2-methoxyphenyl)-3'-methyl-,
2',4'-dimethoxy-6'-hydroxy-2-(4-methoxyphenyl)-3'-methyl-,
2',4'-dimethoxy-6'-hydroxy-2-(2-methoxyphenyl)-3'-methyl-,
4',6'-dimethoxy-2'-hydroxy-3'-methyl-2-(4-nitrophenyl)-,
4',6'-dimethoxy-2'-hydroxy-3'-methyl-2-phenyl-,
3',4'-dimethoxy-2'-hydroxy-2-phenyl-,
4',5'-dimethoxy-2'-hydroxy-2-phenyl-,
4',6'-dimethoxy-2'-hydroxy-2-phenyl-,
5'-fluoro-2'-hydroxy-2-phenyl-,
3'-hydroxy-5'-isopropyl-6'-methoxy-2'-methyl-2-phenyl-,
2'-hydroxy-4'-methoxy-2-(2-methoxyphenyl)-,
2'-hydroxy-4'-methoxy-2-(4-methoxyphenyl)-,
6'-hydroxy-2-(2-methoxyphenyl)-2',3',4'-trimethoxy-,
2'-hydroxy-5'-methoxy-2-phenyl-,
2'-hydroxy-6'-methoxy-2-phenyl-,
and 2'-hydroxy-4'-methoxy-2-phenylacetophenones.

In following the procedures of Examples 1 through 12, part B, using the above chloroformates, the corresponding carbamates are also obtained.

Example 13.—4-phenylacetylphenyl (3-oxapentamethylene)-carbamate

Following the procedure of Example 1, part A, substituting 4'-hydroxy-2-phenylacetophenone for 2'- hydroxy-2-phenylacetophenone, the respective chloroformate is obtained. Following the procedure of part B, commencing with 4-phenylacetylphenyl chloroformate and substituting morpholine for dimethylamine, 4-phenylacetylphenyl (3-oxapentamethylene)-carbamate is obtained.

Example 14.—4-phenylacetylphenyl (3-thiapentamethylene)-carbamate

Following the procedure of Example 13, part B, commencing with 4-phenylacetylphenyl chloroformate and substituting thiamorpholine for morpholine, 4-phenylacetylphenyl (3-thiapentamethylene)carbamate is obtained.

Example 15.—4-phenylacetylphenyl (3-oxahexamethylene)-carbamate

Following the procedure of Example 13, part B, commencing with 4-phenylacetylphenyl chloroformate and substituting homomorpholine for morpholine, 4-phenylacetylphenyl (3-oxahexamethylene)carbamate is obtained.

Following the procedure of Example 1, part A, substituting the 2'-hydroxy-2-phenylacetophenone by 2,2-diphenyl-4'-hydroxyacetophenone, 2,2-diphenyl-2'-hydroxyacetophenone, 2,2-di-p-tolyl-2'-hydroxyacetophenone, and 2,2-di-4-methoxy phenyl-2'-hydroxy - 4' - methoxyacetophenone, the corresponding 4-diphenylacetylphenyl, 2-diphenylacetylphenyl, 2-(di-p-tolylacetyl)phenyl, and 2-(di-4 - methoxyphenylacetyl) - 5 - methoxyphenyl chloroformates are obtained, which by the procedures of part B of Examples 2, 1, 3, 4, 5, 6, 7, 8, 9, 10, 11, 12, and 13, and Examples 14 and 15, are converted to the corresponding unsubstituted carbamates and dimethyl-, methylallyl-methylethyl-, dicrotyl-, tetramethylene-, pentamethylene-, hexamethylene-, heptamethylene-, octamethylene-, (1,1-dimethyltetramethylene)-, (1 - methylpentamethylene)-, (3-oxapentamethylene)-, (3-thiapentamethylene)-, and (3-oxahexamethylene)carbamates.

The carbamates of the invention have demonstrated anti-inflammatory activity as shown by the granuloma pouch technique in rats and provide the veterinarian with a method for treating inflammation in large and small animals as well as birds and poultry. The animals and birds can be commercial animals raised for profit as well as animals kept for pets or research. Inflammatory conditions which can be treated include, but are not limited to, enteritis, iritis, retained placenta, laminitis, rheumatoid and traumatic arthritis, osteoarthritis, periostitis, tendonitis, tenosynovitis, bursitis, and myositis.

What is claimed is:

1. A compound selected from the group consisting of compounds of the formula:

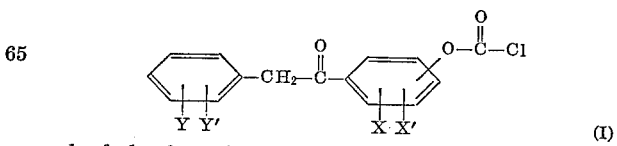

(I)

and of the formula:

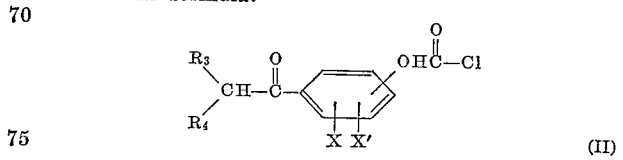

(II)

wherein each of X and Y is from zero to 3 alkoxys of from 1 to 2 carbon atoms, inclusive; X' is selected from the group consisting of from zero to 2 halogens and from zero to 2 alkyls of from 1 to 3 carbon atoms, inclusive; Y' is selected from the group consisting of from zero to 1 halogen, from zero to 1 nitro, and from zero to 1 methyl; and $R_3$ and $R_4$ are selected from the group consisting of phenyl, tolyl, and methoxyphenyl.

2. 4-phenylacetylphenyl chloroformate.
3. 4-diphenylacetylphenyl chloroformate.

References Cited by the Examiner
UNITED STATES PATENTS 2,455,652 12/48 Bralley et al. _____ 260—463
2,496,091 1/50 Hammond _____ 260—463

CHARLES B. PARKER, *Primary Examiner.*

UNITED STATES PATENT OFFICE
CERTIFICATE OF CORRECTION

Patent No. 3,203,972                        August 31, 1965

Edward L. Schumann

It is hereby certified that error appears in the above numbered patent requiring correction and that the said Letters Patent should read as corrected below.

Column 1, line 34, for "where in" read -- wherein --; column 2, line 52, for "abou" read -- about --; column 4, lines 8 and 9, for "(3,4-dimethoxyphenyl)acetyl-phenyl", in italics, read -- (3,4-dimethoxyphenylacetyl)-phenyl --, in italics; column 4, line 64, for "obtaiend" read -- obtained --; column 6, line 43, for "methylallyl-" read -- methylallyl-, --; lines 70 to 75, the formula should appear as shown below instead of as in the patent:

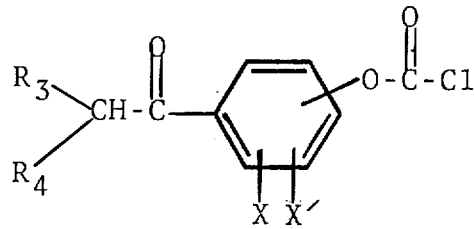

Signed and sealed this 10th day of May 1966.

(SEAL)
Attest:

ERNEST W. SWIDER                        EDWARD J. BRENNER
Attesting Officer                      Commissioner of Patents